United States Patent
Nagasawa et al.

(10) Patent No.: US 9,682,283 B2
(45) Date of Patent: *Jun. 20, 2017

(54) GOLF BALL AND METHOD OF MANUFACTURE

(71) Applicant: Bridgestone Sports Co., Ltd., Tokyo (JP)

(72) Inventors: Hiroyuki Nagasawa, Chichibushi (JP); Katsunobu Mochizuki, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,207

(22) Filed: Jun. 3, 2015

(65) Prior Publication Data

US 2015/0375050 A1    Dec. 31, 2015

(30) Foreign Application Priority Data

Jun. 27, 2014 (JP) .................. 2014-132124
Jun. 27, 2014 (JP) .................. 2014-132137

(51) Int. Cl.

| | | |
|---|---|---|
| A63B 37/12 | (2006.01) | |
| A63B 45/00 | (2006.01) | |
| C08J 7/16 | (2006.01) | |
| A63B 37/00 | (2006.01) | |
| B29C 71/02 | (2006.01) | |
| B29C 71/00 | (2006.01) | |

(52) U.S. Cl.
CPC ...... *A63B 37/0022* (2013.01); *A63B 37/0023* (2013.01); *A63B 37/0027* (2013.01); *A63B 37/0031* (2013.01); *A63B 37/0033* (2013.01); *A63B 45/00* (2013.01); *B29C 71/0009* (2013.01); *B29C 71/02* (2013.01); *C08J 7/16* (2013.01); *B29C 2071/0018* (2013.01)

(58) Field of Classification Search
None
See application file for complete search history.

(56) References Cited

U.S. PATENT DOCUMENTS

| | | |
|---|---|---|
| 3,395,109 A | 7/1968 | Molitor et al. |
| 4,248,432 A | 2/1981 | Hewitt et al. |
| 4,347,338 A | 8/1982 | Torii et al. |
| 4,442,282 A | 4/1984 | Kolycheck |
| 5,006,297 A | 4/1991 | Brown et al. |
| 5,334,673 A | 8/1994 | Wu |
| 5,733,428 A | 3/1998 | Calabria et al. |
| 5,888,437 A | 3/1999 | Calabria et al. |
| 5,897,884 A | 4/1999 | Calabria et al. |
| 5,929,189 A | 7/1999 | Ichikawa et al. |
| 5,947,843 A | 9/1999 | Calabria et al. |
| 6,117,024 A | 9/2000 | Dewanjee |
| 6,190,268 B1 | 2/2001 | Dewanjee |
| 6,458,307 B2 | 10/2002 | Inoue et al. |
| 6,582,325 B1 | 6/2003 | Ichikawa et al. |
| 6,680,122 B2 * | 1/2004 | Shigeo .................. C08G 59/58 205/316 |
| 6,729,975 B2 | 5/2004 | Inoue et al. |
| 6,747,100 B2 | 6/2004 | Ichikawa et al. |
| 6,806,323 B2 | 10/2004 | Ichikawa et al. |
| 6,939,251 B2 | 9/2005 | Ichikawa et al. |
| 7,867,111 B2 | 1/2011 | Matroni et al. |
| 8,182,367 B2 | 5/2012 | Nagasawa et al. |
| 8,367,781 B2 | 2/2013 | Nagasawa et al. |

FOREIGN PATENT DOCUMENTS

| | | |
|---|---|---|
| JP | 58-2063 B2 | 1/1983 |
| JP | 9-271538 A | 10/1997 |
| JP | 11-178949 A | 7/1999 |
| JP | 2002-336378 A | 11/2002 |
| JP | 2002-336380 A | 11/2002 |
| JP | 3494441 B2 | 2/2004 |
| JP | 4051374 B2 | 2/2008 |
| JP | 5212599 B2 | 6/2013 |

\* cited by examiner

*Primary Examiner* — David Buttner

(74) *Attorney, Agent, or Firm* — Sughrue Mion, PLLC

(57) ABSTRACT

In a golf ball having a core and a cover of one or more layer encasing the core, an outermost layer of the cover is molded of a thermoplastic material selected from the group consisting of polyurethane, polyurea and mixtures thereof, and the surface of the cover is treated with a polyisocyanate compound that is free of organic solvent. A method of manufacturing the golf ball is also described. Such golf balls are endowed with an excellent spin performance and scuff resistance, in addition to which productivity of the golf balls is high.

6 Claims, No Drawings

GOLF BALL AND METHOD OF MANUFACTURE

CROSS-REFERENCE TO RELATED APPLICATION

This non-provisional application claims priority under 35 U.S.C. §119(a) on Patent Application Nos. 2014-132124 and 2014-132137 filed in Japan on Jun. 27, 2014 and Jun. 27, 2014, respectively, the entire contents of which are hereby incorporated by reference.

BACKGROUND OF THE INVENTION

Field of the Invention

The present invention relates to a golf ball having a cover made of a thermoplastic material and to a method of manufacturing such a golf ball. More specifically, the invention relates to a golf ball which, by the application of a specific treatment to the surface of the ball cover that has been molded from a thermoplastic material, is endowed with an excellent scuff resistance and spin properties, and relates also to a method of manufacturing the golf ball.

Prior Art

The use of polyurethane materials as golf ball cover-forming materials in recent years is noteworthy. Polyurethane materials, from the standpoint of the molding method used to obtain moldings therefrom, are broadly divided into thermoset polyurethane materials and thermoplastic polyurethane materials. Moldings of the former (thermoset polyurethane materials) can be obtained by mixing under applied heat a urethane prepolymer having isocyanate end groups with a polyol or polyamine curing agent in the form of a liquid starting material, then pouring the mixture directly into a mold and heating to effect a urethane curing reaction.

Numerous golf balls that use such thermoset polyurethane materials have been disclosed in the art, including those described in U.S. Pat. Nos. 5,334,673, 6,117,024 and 6,190,268. Methods of molding thermoset polyurethane materials are disclosed in, for example, U.S. Pat. Nos. 5,006,297, 5,733,428, 5,888437, 5,897,884 and 5,947,843.

Moldings of thermoset polyurethane materials have no plasticity when heated, and so the starting materials and molded articles made therewith cannot be recycled. Moreover, in the production of such moldings, the thermosetting step and the cooling step take a long time, in addition to which the starting materials have a high reactivity when heated and are thus unstable, making the molding time very difficult to control. Hence, the productivity of thermoset polyurethane materials when used to make special moldings such as golf ball covers (moldings which encase a core material) is regarded as inefficient.

By contrast, moldings of thermoplastic polyurethane materials are not obtained by the direct reaction of starting materials; instead, a linear polyurethane material synthesized by employing starting materials and a manufacturing process which differ somewhat from those for the foregoing thermoset polyurethane materials are used in molding. Such polyurethane materials are thermoplastic; thermoplasticized polyurethane materials have the quality of hardening when cooled. Accordingly, it is possible to mold such polyurethane materials using an injection molding machine. The injection molding of thermoplastic polyurethane materials has a very short molding time compared with the molding time for thermoset polyurethane materials and moreover is suitable for precision molding, thus making it ideal as a process for molding golf ball covers. Furthermore, thermoplastic polyurethane materials are recyclable, and thus friendly to the global environment. Golf balls which use thermoplastic polyurethane materials are disclosed in, for example, U.S. Pat. Nos. 3,395,109, 4,248,432 and 4,442,282.

However, golf ball covers made from conventional thermoplastic polyurethane materials leave something to be desired with regard to all of the following: the feel of the ball at impact, controllability, rebound, and scuff resistance on shots with an iron.

To address this problem, JP-A 9-271538 describes a golf ball cover made from a thermoplastic polyurethane material having a high resilience. Yet, even this golf ball cover falls short in terms of scuff resistance on shots with an iron.

JP-A 11-178949 describes a golf ball cover which is composed primarily of the product obtained by reacting a thermoplastic polyurethane material with an isocyanate compound and has a relatively good scuff resistance on shots with an iron. In this cover, an isocyanate compound which is a blocked diisocyanate or an isocyanate dimer is added as an additive to a thermoplastic polyurethane material. This method of addition, by adding the isocyanate compound during melt mixture under applied heat using an extruder or during injection molding, is designed to bring about a reaction during molding.

However, in molding the cover in JP-A 11-178949, the isocyanate compound is prone to deactivation by moisture and thus difficult to handle, making it challenging to obtain a stable reaction product. Also, blocked isocyanates, which are strongly hygroscopic, emit a powerful blocking agent odor when they dissociate under the effect of heat, and thus are unsuitable for molding covers. In addition, when the isocyanate compound is in the form of a powder or solution, the amount of addition to the thermoplastic polyurethane material is difficult to control, which in turn has made it difficult to control the physical properties of the cover. Moreover, owing to the difference between the melting points of the thermoplastic polyurethane material and the isocyanate compound and the difference in their melt viscosities, slippage arises within the molding machine, which sometimes makes thorough mixture impossible to achieve. In the foregoing published art, owing to the above causes, control of the influence by moisture and of the additive loadings in the cover material is inadequate. As a result, it has not been possible to obtain a golf ball cover that is entirely satisfactory in terms of improving the scuff resistance.

Also, the preferred thermoplastic polyurethane material mentioned in JP-A 11-178949 above is based on an aliphatic isocyanate. However, because this thermoplastic polyurethane material has a very large reactivity with isocyanates, making the reaction difficult to control, there have been a number of problems. For example, gelation tends to arise prior to use of the material in injection molding, making it impossible to ensure sufficient plasticity; gelation sometimes occurs during molding; and recycled resin cannot be reclaimed on account of gelation. These problems have made it difficult to put the art described in the above publication to practical use.

JP-B 58-2063 (and the corresponding U.S. Pat. No. 4,347,338) disclose a method of manufacturing thermoset polyurethane molded articles by intimately mixing a compound having two or more isocyanate groups with a thermoplastic resin that does not react with isocyanate groups, blending the resulting mixture with a thermoplastic polyurethane material, then feeding the blend to a molding machine and molding. However, the object of this published art is only to improve solvent resistance and resistance to repeated wear; these publications make no mention of the use of this molding material as a cover material for golf balls. It is desired that golf ball cover materials be materials which satisfy the following properties required of golf balls: rebound, distance, spin properties, controllability, feel at impact, scuff resistance, cut resistance and resistance to discoloration.

JP-A 2002-336378 describes a golf ball obtained using a cover material composed of a thermoplastic polyurethane material and an isocyanate mixture. The cover material is a thermoplastic polyurethane material that is recyclable and moreover has a high resilience and an excellent scuff resistance. This cover material makes it possible both to achieve the good productivity of a thermoplastic polyurethane and to exhibit physical properties comparable with those of a thermoset polyurethane; at the same time, due to the plasticizing effect by the isocyanate compound, this approach enhances the flow properties of the thermoplastic polyurethane material and is thus able to improve productivity. Although this art is outstanding in the above respects, because burn contaminants arise due to direct charging of the isocyanate mixture into the molding machine and there is some variability in the compounding ratio owing to the use of dry blending, the uniformity is poor, giving rise to molding instability. At the same time, the compositional ratio within the isocyanate mixture between the isocyanate compound and the thermoplastic resin that is substantially non-reactive with isocyanate has already been set, and so one has less freedom of choice in the amounts and types of isocyanate compound and thermoplastic resin to be added.

JP-A 2002-336380 describes a golf ball which uses, as the cover stock, a material obtained by compounding a thermoplastic polyurethane material that contains, as a polymeric polyol, a polyether polyol having an average molecular weight of at least 1500 and has a rebound resilience of at least 40% with a specific isocyanate mixture. However, as in the case of the foregoing patent publication, there are a number of undesirable effects, such as the generation of burn contaminants due to charging of the cover stock into the molding machine, molding instability, and also limitations on selection of the loading and type of isocyanate compound added.

JP 5212599 describes a golf ball which has a high rebound and an excellent spin performance and scuff resistance, and also has a high cover material flowability and a high productivity. However, the thermoplastic polyurethane material used in this art is a special resin mixture, and there are challenges regarding the production, supply and cost of such a resin mixture. Moreover, because this art entails charging an injection molding machine and ancillary equipment with a material in which isocyanate groups remain in an unreacted state, due to deposition of the isocyanate ingredient, undesirable effects such as seizing and solidification arise that can cause an increase in the percent defective.

JP 3494441 discloses art where, in a golf ball having a cover made of thermoplastic resin, the surface layer of the cover is subjected to modification treatment, thereby giving a cover having excellent properties. However, although this is an excellent approach that enables the properties to be modified after the cover has been molded of a thermoplastic material of excellent moldability, there remains room for improvement in the degree to which the scuff resistance is enhanced and in the golf ball properties following modification. Particularly in cases where 4,4'-diphenylmethane diisocyanate (MDI) has been selected as the polyisocyanate compound, the MDI must be held at the solidifying point (about 39° C.) or higher in order to place it in a molten liquid state suitable for treatment. In the case of MDI, production of the dimer also requires care; that is, dimer production generally speeds up at a higher temperature, and so close temperature control is required to ensure stable productivity, which can be troublesome. Moreover, in cases where an ionomer material is used in part of the golf ball, there is also a possibility that treatment at a high temperature will give rise to deformation or a change in properties.

JP 4051374 describes a method of manufacturing golf balls produced with a thermoplastic polyurethane, polyurea or mixed material thereof having a high melt index. More specifically, this method includes the step of obtaining a base thermoplastic polyurethane, polyurea or mixed material thereof; the step of raising the melt index of this base resin material; the step of molding the thermoplastic polyurethane material having an increased melt index in a mold; and the subsequent step of treating the molded material with a secondary curing agent such as an isocyanate solution. This art is outstanding in that, by crosslinking the cover material using an isocyanate ingredient, resistance to damage can be imparted while maintaining the other desirable characteristics of the cover, such as the softness and feel. However, in cases where the secondary curing agent includes an organic solvent capable of causing the cover material to swell, depending on the treatment conditions, this may cause deformations on the order of several microns in the dimple shape, which may adversely impact the flight performance, and the appearance of the golf ball may worsen due to solvent infiltration to the cover material interface that arises during molding.

It is therefore an object of this invention to provide a golf ball which, compared with conventional golf balls, has an even better scuff resistance and spin performance, and moreover has an excellent manufacturability. A further object of the invention is to provide a method of manufacturing such golf balls.

SUMMARY OF THE INVENTION

We have discovered that, when producing golf balls having a core and a cover of one or more layer encasing the core, by using a thermoplastic material selected from the group consisting of polyurethane, polyurea and mixtures thereof to mold the outermost layer of the cover, then treating the surface of the cover with a polyisocyanate compound that is free of organic solvent, golf balls having such an outermost layer in the cover are endowed with an excellent scuff resistance and a good spin performance, in addition to which the cover-forming productivity is high.

Accordingly, in a first aspect, the invention provides a golf ball having a core and a cover of one or more layer encasing the core. The cover has an outermost layer molded of a thermoplastic material selected from the group consisting of polyurethane, polyurea and mixtures thereof. The surface of the cover is treated with a polyisocyanate compound that is free of organic solvent.

In one preferred embodiment of the golf ball of the invention, the polyisocyanate compound is one or a mixture of two or more selected from the group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives of any of these, and prepolymers formed of such isocyanate compounds.

In another preferred embodiment of the inventive golf ball, the polyisocyanate compound is one selected from the group consisting of 4,4'-diphenylmethane diisocyanate and polymethylene polyphenyl polyisocyanate, or a mixture thereof. The polyisocyanate compound is more preferably a mixture of 4,4'-diphenylmethane diisocyanate and polymethylene polyphenyl polyisocyanate.

It is preferable for the thermoplastic material of which the outermost layer is molded to have a resin hardness, expressed in terms of Shore D hardness, of from 30 to 65.

Preferably, the outermost layer of the inventive golf ball has a thickness of from 0.3 to 3.0 mm.

In yet another preferred embodiment, the polyurethane or polyurea serving as the thermoplastic material of which the outermost layer material is molded has an isocyanate component which is one or a mixture of two or more selected from the group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate and 1,4-bis(isocyanatomethyl)cyclohexane.

Following treatment of the cover surface, it is preferable for the ball to have a surface hardness, expressed in terms of Shore D hardness, of from 30 to 70.

In a second aspect, the invention provides a method of manufacturing a golf ball having a core and a cover of one or more layer molded over the core, which method includes the steps of, in order: molding an outermost layer of the cover with a thermoplastic material selected from the group of polyurethane, polyurea and mixtures thereof; and treating a surface of the cover with a polyisocyanate compound that is free of organic solvent.

In a preferred embodiment of the golf ball manufacturing method of the invention, the polyisocyanate compound is one or a mixture of two or more selected from the group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives of any of these, and prepolymers formed of such isocyanate compounds.

Typically, the cover surface is treated with the polyisocyanate compound in a state warmed to from 10 to 80° C.

The method of treating the cover surface is typically a dipping method, coating method or dropwise addition method.

A dipping method that involves immersing the cover in a liquid state of the polyisocyanate compound for a period of from 10 to 180 minutes is preferred.

In another embodiment, the manufacturing method further includes, after treatment of the cover surface, the step of removing surplus polyisocyanate compound from the cover surface. This step of removing surplus polyisocyanate compound preferably involves washing the cover surface with water or one or more organic solvent selected from the group consisting of acetone, ethyl acetate, methyl isobutyl ketone, cyclohexanone, toluene and xylene.

In yet another embodiment, the manufacturing method further includes, after treatment of the cover surface, the step of heat-treating the cover surface at from 15 to 150° C. for a period of not more than 24 hours.

The golf ball and golf ball manufacturing method of the invention enable golf balls endowed with an excellent spin performance and scuff resistance to be obtained, in addition to which golf ball productivity is high.

DETAILED DESCRIPTION OF THE INVENTION

The objects, features and advantages of the invention will become more apparent from the following detailed description.

The golf ball of the invention has a core and a cover of one or more layer encasing the core. The outermost layer of the cover is molded of a thermoplastic material selected from the group consisting of polyurethane, polyurea and mixtures thereof, and the surface of the cover is treated with a polyisocyanate compound that is free of organic solvent. Golf balls having such a cover are endowed with an excellent rebound, spin performance and scuff resistance.

The cover encases the core and may consist of a single layer or a plurality of two or more layers. In this invention, the outermost layer of the cover is formed of a thermoplastic material selected from the group consisting of polyurethane, polyurea and mixtures thereof. Here, the proportion of the overall resin composition accounted for by the polyurethane, the polyurea or a mixture thereof, although not particularly limited, is preferably at least 50 wt %, and more preferably at least 80 wt %. The polyurethane and the polyurea are described below.

Polyurethane

The thermoplastic polyurethane material has a structure which includes soft segments composed of a polymeric polyol that is a long-chain polyol (polymeric glycol), and hard segments composed of a chain extender and a polyisocyanate. Here, the polymeric polyol serving as a starting material is not subject to any particular limitation, and may be any that is used in the prior art relating to thermoplastic polyurethane materials. Exemplary polymeric polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Illustrative examples of polyester polyols include adipate-based polyols such as polyethylene adipate glycol, polypropylene adipate glycol, polybutadiene adipate glycol and polyhexamethylene adipate glycol; and lactone-based polyols such as polycaprolactone polyol. Illustrative examples of polyether polyols include poly(ethylene glycol), poly(propylene glycol), poly(tetramethylene glycol) and poly(methyltetramethylene glycol). These may be used singly or as a combination of two or more thereof.

The number-average molecular weight of these long-chain polyols is preferably in the range of 1,000 to 5,000. By using a long-chain polyol having such a number-average molecular weight, golf balls made with a thermoplastic polyurethane composition having excellent properties such as the above-mentioned resilience and productivity can be reliably obtained. The number-average molecular weight of the long-chain polyol is more preferably in the range of 1,500 to 4,000, and even more preferably in the range of 1,700 to 3,500.

Here, and below, "number-average molecular weight" refers to the number-average molecular weight calculated based on the hydroxyl number measured in accordance with JIS K-1557.

The chain extender is not particularly limited, although preferred use can be made of one that is used in the prior art relating to thermoplastic polyurethanes. A low-molecular-weight compound which has a molecular weight of 2,000 or less and bears on the molecule two or more active hydrogen atoms capable of reacting with isocyanate groups can be used in this invention, with the use of an aliphatic diol having from 2 to 12 carbons being preferred. Specific examples of the chain extender include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

The polyisocyanate compound is not subject to any particular limitation, although preferred use may be made of one that is used in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. Depending on the type of isocyanate used, the cross-linking reaction during injection molding may be difficult to control.

Although not an essential ingredient, a thermoplastic resin or elastomer other than a thermoplastic polyurethane may also be included. More specifically, use may be made of one, two or more selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of polyester elastomers, polyamide elastomers and polyacetals is especially preferred because these increase the resilience and scuff resistance due to reaction with the isocyanate groups while yet maintaining a good productivity. When these ingredients are included, the content thereof is suitably selected so as to, for example, adjust the cover material hardness, improve the resilience, improve the flow properties or improve adhesion. The content of these ingredients, although not particularly limited, may be set to preferably at least 5 parts by weight per 100 parts by weight of the thermoplastic polyurethane component. Although there is no particular upper limit, the content per 100 parts by weight of the thermoplastic polyurethane component may be set to preferably not more than 100 parts by weight, more preferably not more than 75 parts by weight, and even more preferably not more than 50 parts by weight.

The ratio of active hydrogen atoms to isocyanate groups in the above polyurethane-forming reaction may be adjusted within a desirable range so as to make it possible to obtain golf balls which are made with a thermoplastic polyurethane composition and have various improved properties, such as rebound, spin performance, scuff resistance and manufacturability. Specifically, in preparing a thermoplastic polyurethane by reacting the above long-chain polyol, polyisocyanate compound and chain extender, it is desirable to use the respective components in proportions such that the amount of isocyanate groups included in the polyisocyanate compound per mole of active hydrogen atoms on the long-chain polyol and the chain extender is from 0.95 to 1.05 moles.

No particular limitation is imposed on the method of preparing the thermoplastic polyurethane. Preparation may be carried out by either a prepolymer process or a one-shot process which uses a long-chain polyol, a chain extender and a polyisocyanate compound and employs a known urethane-forming reaction. Of these, a process in which melt polymerization is carried out in a substantially solvent-free state is preferred. Production by continuous melt polymerization using a multiple screw extruder is especially preferred.

A commercial product may be used as the above thermoplastic polyurethane material. Illustrative examples include the products available under the trade name "Pandex" from DIC Bayer Polymer, Ltd., and the products available under the trade name "Resamine" from Dainichiseika Color & Chemicals Mfg. Co., Ltd.

Polyurea

The polyurea is a resin composition composed primarily of urea linkages formed by reacting (i) an isocyanate with (ii) an amine-terminated compound. This resin composition is described in detail below.

(i) Isocyanate

The isocyanate is preferably one that is used in the prior art relating to thermoplastic polyurethanes, but is not subject to any particular limitation. Use may be made of isocyanates similar to those described above in connection with the polyurethane material.

(ii) Amine-Terminated Compound

An amine-terminated compound is a compound having an amino group at the end of the molecular chain. In the present invention, the long-chain polyamines and/or amine curing agents shown below may be used.

A long-chain polyamine is an amine compound which has on the molecule at least two amino groups capable of reacting with isocyanate groups, and which has a number-average molecular weight of from 1,000 to 5,000. In this invention, the number-average molecular weight is more preferably from 1,500 to 4,000, and even more preferably from 1,900 to 3,000. Within this average molecular weight range, an even better resilience and productivity are obtained. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or as combinations of two or more thereof.

An amine curing agent is an amine compound which has on the molecule at least two amino groups capable of reacting with isocyanate groups, and which has a number-average molecular weight of less than 1,000. In this invention, the number-average molecular weight is more preferably less than 800, and even more preferably less than 600. Such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino)cyclohexane, derivatives of 4,4'-bis(sec-butylamino)dicyclohexylmethane, 4,4'-dicyclohexylmethanediamine, 1,4-cyclohexane bis (methylamine), 1,3-cyclohexane bis(methylamine), diethylene glycol di(aminopropyl)ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobis(propylamine), monoethanolamine, diethanolamine, triethanolamine, monoisopropanolamine, diisopropanolamine, isophoronediamine, 4,4'-methylenebis(2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis(sec-butylamino) diphenylmethane and derivatives thereof, 1,4-bis(sec-butylamino)benzene, 1,2-bis(sec-butylamino)benzene, N,N'-dialkylaminodiphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or as combinations of two or more thereof.

(iii) Polyol

Though not an essential component, in addition to the above-described components (i) and (ii), a polyol may also be included in the polyurea. In the present invention, although not particularly limited, the polyol is preferably one that has hitherto been used in the art relating to thermoplastic polyurethanes. Specific examples include the long-chain polyols and/or polyol curing agents described below.

The long-chain polyol may be any that has hitherto been used in the art relating to thermoplastic polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or as combinations of two or more thereof.

The long-chain polyol has a number-average molecular weight of preferably from 1,000 to 5,000, and more preferably from 1,700 to 3,500. In this average molecular weight range, an even better resilience and productivity are obtained.

The polyol curing agent is preferably one that has hitherto been used in the art relating to thermoplastic polyurethanes, but is not subject to any particular limitation. In this invention, use may be made of a low-molecular-weight compound having on the molecule at least two active hydrogen atoms capable of reacting with isocyanate groups, and having a molecular weight of less than 1,000. Of these, the use of aliphatic diols having from 2 to 12 carbons is preferred. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred. The polyol curing agent has a number-average molecular weight of preferably less than 800, and more preferably less than 600.

Where necessary, various additives may also be included in the polyurea. For example, pigments, inorganic fillers, dispersants, antioxidants, light stabilizers, ultraviolet absorbers and mold release agents may be suitably included.

A known method may be used to produce the polyurea. A known method such as a prepolymer process or a one-shot process may be suitably selected for this purpose.

The method of molding the cover using the above polyurethane and the above polyurea may involve, for example, feeding these materials to an injection-molding machine and injecting them over the core. The molding temperature in such a case varies depending on the formulation and other factors, but is generally in the range of 150 to 270° C.

Treatment of Cover Surface

The golf ball of the invention is characterized in that the surface of the outermost cover layer molded as described above is treated with a polyisocyanate compound that is free of organic solvent. The method of carrying out this surface treatment is described below.

This treatment method uses a polyisocyanate compound that is free of organic solvent. The polyisocyanate compound, although not particularly limited, is typically selected from the group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives of any of these, and prepolymers formed of such isocyanate compounds.

An aromatic polyisocyanate is preferably used as the polyisocyanate compound, with the use of 4,4'-diphenylmethane diisocyanate (monomeric, or "pure," MDI) or polymethylene polyphenyl polyisocyanate (polymeric MDI) being especially preferred. When an aromatic polyisocyanate is used in the invention, because it has a high reactivity with the reactive groups on the thermoplastic resin, the intended effects of the invention can be successively achieved. The use of polymeric MDI is preferred because it has a larger number of isocyanate groups than monomeric MDI and thus provides a large scuff resistance improving effect due to crosslink formation, and moreover because it is a liquid at normal temperatures and thus has an excellent handleability. However, polymeric MDI generally has a dark brown appearance, which may discolor and contaminate the cover material to be treated. Because such discoloration is pronounced when surface treatment is carried out with polymeric MDI in the state of a solution obtained by dissolution in an organic solvent, in the practice of the invention, owing to concern over such discoloration, the polymeric MDI is used in a state that is free of organic solvents.

In this invention, the preliminary treatments described in, for example, JP 4114198 or JP 4247735 may be suitably used as methods for reducing discoloration by polymeric MDI. Although the techniques described in the foregoing patent publications may be adopted for use here, the possibilities are not limited to these alone. When such preliminary treatment is carried out and the treatment is followed by suitable washing, substantially no discoloration or contamination arises.

A dipping method, coating method (spraying method), infiltration method under heat and pressure application, dropwise addition method or the like may be suitably used as the method of treatment with the polyisocyanate compound. From the standpoint of process control and productivity, the use of a dipping method, coating method or dropwise addition method is especially preferred. The length of treatment by the dipping method is preferably from 1 to 180 minutes, more preferably from 10 to 120 minutes, and even more preferably from 20 to 90 minutes. If the treatment time is too short, a sufficient crosslinking effect is difficult to obtain. On the other hand, if the treatment time is too long, there is a possibility of substantial discoloration of the cover surface by excess polyisocyanate compound. Also, with a long treatment time, the production lead time becomes long, which is not very desirable from the standpoint of productivity. With regard to the temperature during this treatment, from the standpoint of the productivity, it is preferable to control the temperature within a range that allows a stable molten liquid state to be maintained and also allows the reactivity to be stably maintained. The temperature is preferably from 10 to 80° C., more preferably from 15 to 60° C., and even more preferably from 20 to 55° C. If the treatment temperature is too low, infiltration and diffusion to the cover material and reactivity at the surface layer interface may be inadequate, as a result of which the desired properties may not be achieved. On the other hand, if the treatment temperature is too high, infiltration and diffusion to the cover material or reactivity at the surface layer interface increases and there is a possibility of greater discoloration of the cover surface on account of excess polyisocyanate compound. Also, in cases where the ball appearance including the dimple shapes-changes, or an ionomeric material is used in part of the golf ball, there is a possibility that this will give rise to changes in the physical properties of the ball. By carrying out treatment for a length of time and at a temperature in these preferred ranges, it is possible to obtain a sufficient crosslinking effect and, in turn, to achieve the desired ball properties without a loss of productivity.

To control the reactivity and obtain a golf ball having an even better scuff resistance and spin performance, a catalyst or a compound having two, three or more functional groups that react with isocyanate groups can be incorporated beforehand in the polyisocyanate compound treatment agent or in the cover material to be treated. The method of incorporating such a compound may involve mixing the compound, in a dispersed state, with a liquid melt of the polyisocyanate compound treatment agent; using a mixer such as a single-screw or twin-screw extruder to mix the compound into the thermoplastic resin that is the material to be treated (cover material); or charging the respective ingredients in a dry blended state into an injection molding machine. If the last of these methods is used, during charging, the compound may be charged alone, or may be rendered beforehand into a masterbatch state using a suitable base material.

If, after treatment with the above polyisocyanate compound, excess polyisocyanate compound remains on the ball surface, this tends to cause adverse effects such as logo mark transfer defects and the peeling of paint, and moreover may lead to appearance defects such as discoloration over time. Hence, it is preferable to wash the ball surface with a suitable organic solvent or water or the like. Particularly in cases where polymeric MDI is used, because this compound is a dark brown-colored liquid, unless the ball surface is thoroughly washed, appearance defects may end up arising. The organic solvent used at this time should be suitably selected from among organic solvents that dissolve the polyisocyanate compound and do not dissolve the polyurethane, polyurea or a mixture thereof serving as a cover material component. Preferred use can be made of an ester, a ketone or some other suitable organic solvent such as benzene, dioxane or carbon tetrachloride which dissolves the polyisocyanate compound. In particular, acetone, ethyl acetate, methyl ethyl ketone, methyl isobutyl ketone, cyclohexanone, toluene and xylene, either alone or in admixture, can be suitably used as the organic solvent, although the choices are not necessarily limited to these. Washing with the above organic solvent may be carried out by an ordinary method. For example, use may be made of dipping, shaking, ultrasonic waves, microbubbles or nanobubbles, a submerged jet or a shower. It is desirable for the washing time to be set so as to complete washing in preferably not more than 120 seconds, more preferably not more than 60 seconds, and even more preferably not more than 30 seconds. If the washing time is long and excess washing occurs, although appearance defects due to the residual presence of polyisocyanate compound are suppressed, the polyisocyanate compound with which the surface of the golf ball cover has been treated may end up being removed, as a result of which crosslinking may not proceed to a sufficient degree. There is also a possibility of undesirable effects owing to penetration of the organic solvent into the cover material and consequent swelling of the cover material, such as changes in shape at the cover surface due to the relaxation of residual stresses that have arisen in the cover during molding, damage to the resin interface that has formed during molding, and dissolution of low-molecular-weight ingredients. Hence, it is preferable to carry out washing for a suitable treatment time. In addition, there is a possibility that an appropriate flight performance may not be achieved or that the distance traveled by the ball may be adversely affected by solvent-induced changes in the dimple shapes or swelling of the support pin marks that form during injection molding.

Drying treatment can be carried out preliminary to surface treatment with the above polyisocyanate compound. That is, when treating a cover molded from a thermoplastic material that is a polyurethane, a polyurea or a mixture thereof, in order to remove moisture contained in the cover material and thereby stabilize the physical properties following treatment or increase the life of the treatment solution, it may be desirable to carry out, as needed, drying treatment or the like beforehand, although this is not always the case. A common method such as warm-air drying or vacuum drying may be used as the drying treatment. Such treatment preliminary to surface treatment, particularly in the case of golf balls containing an ionomeric material in a portion thereof, is preferably carried out under conditions that do not cause deformation or changes in the physical properties. When warm air drying is carried in such preliminary treatment, although not particularly limited, it is desirable to set the temperature to from 15 to 60° C., and preferably from 20 to 55° C., and to set the time to preferably from 10 to 180 minutes, more preferably from 15 to 120 minutes, and even more preferably from 30 to 60 minutes. The drying conditions may be suitably selected according to the moisture content within the cover material and are typically adjusted so that the moisture content in the cover material becomes preferably 5,000 ppm or less, more preferably 3,500 ppm or less, even more preferably 2,500 ppm or less, and most preferably 1,000 ppm or less.

Following surface treatment with the polyisocyanate compound, it is preferable to provide a suitable curing step in order to have the crosslinking reactions between the polyurethane or polyurea thermoplastic material and the polyisocyanate compound effectively proceed, thereby enhancing and stabilizing the physical properties and quality, and also to control and shorten the production takt time. However, because reaction of the isocyanate proceeds even at room temperature, it is not always necessary to provide a curing step. In cases where a curing step is provided, a method that causes the crosslinking reactions to proceed under the effect of heat or pressure and in the presence of a catalyst may be suitably selected. Specifically, it is preferable to carry out heating treatment under suitable temperature and time conditions that are typically from 15 to 150°

C. for up to 24 hours, preferably from 20 to 100° C. for up to 12 hours, and more preferably from 30 to 70° C. for up to 6 hours.

The degree to which, following surface treatment with the polyisocyanate compound, crosslinking reactions between the polyurethane or polyurea thermoplastic material and the polyisocyanate compound have proceeded can be determined by a suitable technique. For example, it is effective to use attenuated total reflectance (ATR) Fourier transform infrared absorption spectroscopy (FT-IR) to measure the ball surface after curing. In this case, the progress of the crosslinking reactions can be ascertained by examining peaks attributable to isocyanate groups and peaks attributable to NHCO groups. Alternatively, the degree to which crosslinking has proceeded can be determined by immersing the cover material in a solvent such as tetrahydrofuran, chloroform or dimethylformamide, and measuring the weight of the dissolved matter. Measuring the microhardness in the cross-sectional direction of the cover is also an effective method. By using the microhardness to check for hardness changes in the cross-sectional direction of the cover, the treated region can be qualitatively and quantitatively characterized.

The pickup of polyisocyanate compound following surface treatment can be suitably adjusted according to the weight and desired properties of the golf ball as a whole. This pickup, expressed in terms of weight change, is preferably in the range of 0.01 to 1.0 g, more preferably in the range of 0.03 to 0.8 g, and even more preferably in the range of 0.05 to 0.75 g. If the weight change is too small, impregnation by the isocyanate compound may be inadequate and a suitable property enhancing effects may not be obtained. If the weight change is too large, control of the ball weight within a range that conforms to the rules for golf balls and various types of control, including of dimple changes, may be difficult. With regard to the depth of impregnation by the polyisocyanate compound, the process conditions may be suitably selected so as to obtain the desired physical properties. Modification by this method has the effect of, given that the polyisocyanate compound penetrates and disperses from the surface, facilitating the creation of a gradient of properties. Imparting a property gradient within a cover layer of a given thickness simulates, and indeed serves the same purpose as, providing a multilayer cover, thus making it possible to achieve cover characteristics that never before existed. Moreover, the state of impregnation by the polyisocyanate compound may vary depending on whether an organic solvent is present. If an organic solvent is used, changes in the physical properties can be achieved to a greater depth; if an organic solvent is not used, changes in the physical properties are easily imparted at positions closer to the interface. When treatment is carried out by a method that does not use an organic solvent, the physical properties near the surface of the outermost cover layer and the physical properties within the cover are easily differentiated, which can greatly increase the degree of freedom in golf ball design.

The method of molding the outermost layer of the cover is exemplified by a method that feeds the resin blend to an injection molding machine and injects the molten resin blend over the core, thereby molding the outermost layer of the cover. In such a case, the molding temperature varies according to such factors as the type of thermoplastic polyurethane, but is generally in the range of 150 to 270° C.

In the cover of one or more layer forming a part of the inventive golf ball, the ball surface hardness following the above-described surface treatment, expressed in terms of Durometer D hardness, is preferably from 30 to 70, and more preferably from 33 to 65. If the hardness of the outermost layer of the cover is too low, the spin rate of the ball on shots with a driver may increase, lowering the distance traveled by the ball. On the other hand, if the hardness of the cover outermost layer is too high, the feel at impact may worsen and the resulting rebound and durability performance may be inferior to those of the urethane material itself.

The rebound resilience of the outermost layer prior to the above surface treatment, although not particularly limited, is preferably at least 35%, more preferably at least 40%, and even more preferably at least 45%. If the rebound resilience of the cover outermost layer is too low, the distance traveled by the golf ball may greatly decrease. On the other hand, if the rebound resilience of the outermost layer of the cover is too high, the initial velocity on shots of up to 100 yards that require control and on puts becomes too high and may not feel right to the golfer. As used herein, "rebound resilience" refers to the rebound resilience measured in accordance with JIS K7311.

The core used in the golf ball of the invention is not particularly limited. Use may be made of various types of cores, such as, for example, a solid core for a two-piece ball, a solid core having a plurality of vulcanized rubber layers, a solid core having a plurality of resin layers, or a wound core having a layer of rubber thread. No limitations are imposed on the diameter, weight, hardness, constituent materials and other characteristics of the core.

In the golf ball of the invention, when the cover has two or more layers—that is, when the cover has a construction which includes an intermediate layer to the inside of the outermost layer, no particular limitations are imposed on the hardness, material, thickness and other characteristics of the intermediate layer. To enhance adherence between the intermediate layer and the outermost layer, where necessary, a primer layer may be provided or a common known technique for improving adherence or adhesion may be employed. Examples of common known techniques include plasma surface treatment (e.g., microwave plasma treatment, high-frequency plasma treatment, atmospheric pressure plasma treatment), corona discharge treatment, flame treatment, treatment by exposure to ultraviolet irradiation, chlorine treatment, treatment by wiping the surface with an organic solvent, silane coupling agent coating treatment, honing treatment, chemical etching treatment and physical surface roughening treatment. These types of treatment may be used singly or as combinations of two or more thereof.

The thickness of the outermost layer of the cover may be set in the range of 0.1 to 5.0 mm, preferably 0.3 to 3.0 mm, and more preferably 0.5 to 2.0 mm. In cases where the cover is formed so as to have a multilayer structure of two or more layers, the thickness of the intermediate layer, although not particularly limited, may be set in the range of 0.1 to 5.0 mm, preferably 0.3 to 3.0 mm, and more preferably 0.5 to 2.0 mm.

The golf ball of the invention is preferably formed to a diameter and weight in accordance with the Rules of Golf. Generally, it is formed to a diameter of not less than 42.67 mm and a weight of not more than 45.93 g, although the diameter is preferably from 42.67 to 42.9 mm.

EXAMPLES

The following Examples and Comparative Examples are provided to illustrate the invention, and are not intended by way of limitation.

Examples 1 to 23, Comparative Examples 1 to 8

Core compositions were prepared according to the formulations shown in Table 1 below, following which solid cores were fabricated by molding and vulcanization of the core compositions at 155° C. for 15 minutes.

TABLE 1

| Core formulation (pbw) | A | B | C |
|---|---|---|---|
| Polybutadiene I | 80 | 80 | 80 |
| Polybutadiene II | 20 | 20 | 20 |
| Zinc acrylate | 25 | 25 | 29.5 |
| Barium sulfate | 27.6 | 19.6 | 21.46 |
| Zinc oxide | 4 | 4 | 4 |
| Zinc salt of pentachlorothiophenol | 0.1 | 0.4 | 0.3 |
| Antioxidant | 0.1 | 0.1 | 0.1 |
| Peroxide I | 3 | 2.5 | |
| Peroxide II | | | 1 |

Details on the above core materials are given below. Numbers in this table indicate parts by weight.

Polybutadiene I: Available under the trade name "BR01" from JSR Corporation
Polybutadiene II: Available under the trade name "BR51" from JSR Corporation
Zinc acrylate: Available from Nihon Jyoryu Kogyo Co., Ltd.
Barium sulfate: Available as "Precipitated Barium Sulfate 100" from Sakai Chemical Co., Ltd.
Zinc oxide: Available from Sakai Chemical Co. Ltd.
Antioxidant: 2,2'-Methylenebis(4-methyl-6-t-butyl-phenol), available under the trade name "Nocrac NS-6" from Ouchi Shinko Chemical Industry Co., Ltd.
Peroxide I: A mixture of 1,1-di(t-butylperoxy)cyclo-hexane and silica; available under the trade name "Perhexa C-40" from NOF Corporation
Peroxide II: Dicumyl peroxide; available under the trade name "Percumyl D" from NOF Corporation Formation of Cover (Envelope Layer, Intermediate Layer and Outermost Layer)

Next, the respective layers of the cover (envelope layer, intermediate layer and outermost layer) were successively molded, over the core obtained as described above, by an injection molding method from the formulations shown in Table 2 below. At this time, specific dimples common to all the balls were formed on the surface of the cover in each of the Working Examples of the invention and the Comparative Examples.

TABLE 2

| | Resin formulation (pbw) | | | | | | | |
|---|---|---|---|---|---|---|---|---|
| | (1) | (2) | (3) | (4) | (5) | (6) | (7) | (8) |
| HPF 1000 | 100 | | | | | | | |
| Himilan 1605 | | 50 | | | | | | |
| Himilan 1557 | | 15 | | | | | | |
| Himilan 1706 | | 35 | | | | | | |
| Nucrel AN4319 | | | 20 | | | | | |
| Nucrel AN4221C | | | 80 | | | | | |
| Magnesium stearate | | | 60 | | | | | |
| Magnesium oxide | | | 1.7 | | | | | |
| Trimethylolpropane | | | 1.1 | | | | | |
| T8283 | | | | 62.5 | | | | 62.5 |
| T8290 | | | | 37.5 | 100 | 50 | | 37.5 |
| T8295 | | | | | | 50 | 50 | |
| T8260 | | | | | | | 50 | |
| Hytrel 4001 | | | | 12 | | | | 12 |
| Titanium oxide | | | | 3.5 | 3.5 | 3.5 | 3.5 | 3.5 |
| Ultramarine | | | | 0.4 | 0.4 | 0.4 | 0.4 | 0.4 |
| Polyester wax | | | | 1 | 1 | 1 | 1 | 1 |
| Montan wax | | | | 0.4 | 0.4 | 0.4 | 0.4 | 0.4 |
| Isocyanate compound | | | | | | | | 7.5 |
| Rebound resilience (%) | | | | 55 | 51 | 51 | 50 | 55 |

Trade names for the materials mentioned in the above table are as follows.

HPF 1000: An ionomer available from E. I. DuPont de Nemours & Co.
Himilan: Ionomers available from DuPont-Mitsui Polychemicals Co., Ltd.
Nucrel AN4319 and Nucrel AN4221C:
"Nucrel" available from DuPont-Mitsui Polychemicals Co., Ltd.
Magnesium stearate:
Available under the trade name "Magnesium Stearate G" from NOF Corporation
Magnesium oxide:
Available under the trade name "Kyowamag MF150" from Kyowa Chemical Industry Co., Ltd.
T8283: An ether type thermoplastic polyurethane having a JIS-A hardness of 83 and a rebound resilience of 55%; available under the trade name "Pandex T8283" from DIC Bayer Polymer, Ltd.
T8290: An ether type thermoplastic polyurethane having a JIS-A hardness of 93 and a rebound resilience of 52%; available under the trade name "Pandex T8290" from DIC Bayer Polymer, Ltd.
T8295: An ether type thermoplastic polyurethane having a JIS-A hardness of 97 and a rebound resilience of 44%; available under the trade name "Pandex T8295" from DIC Bayer Polymer, Ltd.
T8260: An ether type thermoplastic polyurethane having a Durometer D hardness of 56 and a rebound resilience of 46%; available under the trade name "Pandex T8260" from DIC Bayer Polymer, Ltd.
Hytrel 4001: A polyether ester elastomer available from DuPont-Toray Co., Ltd.; Durometer D hardness, 40; rebound resilience of 63% (measurement method: BS903)
Polyethylene wax:
Available under the trade name "Sanwax 161P" from Sanyo Chemical Industries, Ltd.
Montan wax: Available under the trade name "Licowax E" from Clariant (Japan) K. K.
Isocyanate compound:
4,4'-Diphenylmethane diisocyanate Regarding the rebound resiliences of the above materials, values for the urethane materials were obtained by measuring the rebound resilience in accordance with JIS-K7311, and the value for the polyether ester elastomer was obtained by measuring the rebound resilience in accordance with BS903.

Next, the isocyanate compounds shown in Table 3 below were selected and surface treatment of the cover surface was carried out in the respective Working Examples and Comparative Examples. This surface treatment involved, as shown in Tables 4 to 6 below, successively carrying out the following steps:
(1) preliminary warming
(2) dipping treatment with an isocyanate compound
(3) washing, and
(4) curing.

TABLE 3

| Isocyanate compound | J243 | 44V10 | 44V20L | m-MDI |
|---|---|---|---|---|
| MDI content (%) | 59 | 45 | 41 | ≥98 |
| Viscosity at 25° C. (mPa · s) | 25 | 120 | 180 | |
| NCO group content (%) | 32.3 | 31 | 31 | 33.6 |
| NCO equivalent weight | 130 | 135 | 135 | 125 |
| Specific gravity | 1.21 | 1.23 | 1.23 | 1.23 |
| Prepolymer content (%) | 1 to 10 | | | |
| Appearance at normal temperature | dark brown liquid | blackish brown liquid | blackish brown liquid | white or light yellow solid |

The isocyanate compounds in the above table are described below.

m-MDI: Monomeric MDI, available under the trade name "Sumidur 44S" from Sumika Bayer Urethane Co., Ltd.

44V20L: Polymeric MDI, available under the trade name "Sumidur p-MDI 44V20L" from Sumika Bayer Urethane Co., Ltd. (medium-viscosity type)

44V10: Polymeric MDI, available under the trade name "Sumidur p-MDI 44V10" from Sumika Bayer Urethane Co., Ltd. (low-viscosity type)

J243: Polymeric MDI, available under the trade name "SBU Isocyanate J243" from Sumika Bayer Urethane Co., Ltd. (very low-viscosity type)

The material hardnesses of the cover (envelope layer, intermediate layer and outermost layer) were obtained by forming the respective resin materials into sheets having a thickness of 2 mm, leaving the sheets to stand at 23° C. for two weeks, then stacking the sheets to a thickness of at least 6 mm and measuring the hardness using a type D durometer in accordance with ASTM D2240-95.

Golf balls on which the above surface treatment had been carried out were evaluated by the methods described below. The results are shown in Tables 4 and 5 (Working Examples) and Table 6 (Comparative Examples).

Deflection (mm)

The golf ball was placed on a steel plate and the amount of deformation (mm) by the ball when compressed at a rate of 10 mm/min under a final load of 1,275 N (130 kgf) from an initial load of 98 N (10 kgf) was measured. Measurement was carried out at a temperature of 23±1° C.

Initial Velocity (m/s)

The initial velocity were measured using an initial velocity measuring apparatus of the same type as the USGA drum rotation-type initial velocity instrument approved by the R&A. The balls serving as the samples were held isothermally at a temperature of 23±1° C. for at least three hours, then tested in a chamber at a room temperature of 23±2° C. Ten samples were each hit twice, and the time taken for the ball to traverse a distance of 6.28 ft (1.91 m) was measured and used to compute the initial velocity (m/s).

Surface Hardness (Shore D Hardness)

Measurements were taken by perpendicularly pressing the indenter of a type D durometer that conforms to ASTM D2240-95 against the surface of the ball. The surface hardness is the measured value obtained at a dimple-free area (land) on the ball surface. This hardness was measured after holding the balls isothermally at 23±1° C.

Flight Performance

A driver (W#1) was mounted on a golf swing robot, and the spin rate, carry and total distance when the ball was struck at a head speed of 45 m/s were measured. The club used was a TourStage X-Drive 707 (2012 model; loft angle, 9.5°) manufactured by Bridgestone Sports Co., Ltd.

Spin Performance on Approach Shots

A sand wedge (SW) was mounted on a golf swing robot, and the spin rate when the ball was struck at a head speed of 20 m/s was measured. The club used was a TourStage X-WEDGE (loft angle, 56°).

Scuff Resistance

The balls were held at 23° C. and five balls of each type were hit at a head speed of 33 m/s using a pitching wedge mounted on a swing robot machine. The damage to the ball from the impact was visually evaluated based on the following 5-point scale, and the average score for each type of ball was calculated.

5: No damage or substantially no damage.
4: Damage is apparent but so slight as to be of substantially no concern.
3: Surface is slightly frayed.
2: Some fraying of surface or loss of dimples.
1: Dimples completely obliterated in places.

Appearance

Balls with a surface appearance that posed no particular problem were rated as "Good." Balls in which there arose appearance defects such as the swelling of marks from the support pins during injection molding or in which the color of the ball had worsened were rated as "NG."

Productivity

The percentage of balls with defects such as burn contaminants was determined for 1,000 molded golf balls. Balls for which the percent defective is lower than 2.5% were rated as "Good"; balls for which the percent defective is 2.5% or higher were rated as "NG."

TABLE 4

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Core | Core formulation | | A | A | A | A | A | A | A | B | B | B | B | C |
| | Core diameter (mm) | | 35.4 | 35.4 | 35.4 | 35.4 | 35.4 | 35.4 | 35.4 | 37.7 | 37.7 | 37.7 | 37.7 | 36.3 |
| Cover | Envelope layer | Material | (3) | (3) | (3) | (3) | (3) | (3) | (3) | — | — | — | — | (1) |
| | | Thickness (mm) | 1.7 | 1.7 | 1.7 | 1.7 | 1.7 | 1.7 | 1.7 | — | — | — | — | 1.3 |
| | | Shore D hardness (material hardness) | 55 | 55 | 55 | 55 | 55 | 55 | 55 | — | — | — | — | 51 |
| | Intermediate layer | Material | (2) | (2) | (2) | (2) | (2) | (2) | (2) | (2) | (2) | (2) | (2) | (2) |
| | | Thickness (mm) | 1.1 | 1.1 | 1.1 | 1.1 | 1.1 | 1.1 | 1.1 | 1.7 | 1.7 | 1.7 | 1.7 | 1.7 |
| | | Shore D hardness (material hardness) | 62 | 62 | 62 | 62 | 62 | 62 | 62 | 62 | 62 | 62 | 62 | 62 |
| | Outermost layer | Material | (4) | (4) | (4) | (4) | (4) | (4) | (4) | (5) | (5) | (5) | (5) | (6) |
| | | Thickness (mm) | 0.8 | 0.8 | 0.8 | 0.8 | 0.8 | 0.8 | 0.8 | 0.8 | 0.8 | 0.8 | 0.8 | 0.8 |
| | | Shore D hardness (material hardness) | 34 | 34 | 34 | 34 | 34 | 34 | 34 | 40 | 40 | 40 | 40 | 44 |
| Surface treatment | Preliminary warming | Temperature (° C.) | 55 | 55 | 55 | 55 | 55 | 55 | 55 | 55 | 55 | 55 | 55 | 55 |
| | | Time (min) | 30 | 30 | 30 | 30 | 30 | 30 | 30 | 60 | 60 | 60 | 60 | 60 |
| | Dipping treatment | Isocyanate compound | 44V20L | 44V20L | 44V20L | 44V20L | 44V20L | 44V20L | 44V20L | 44V20L | 44V20L | 44V20L | 44V20L | 44V20L |
| | | Type of solvent | — | — | — | — | — | — | — | — | — | — | — | — |
| | | Concentration (wt %) | 100 | 100 | 100 | 100 | 100 | 100 | 100 | 100 | 100 | 100 | 100 | 100 |
| | | Treatment temperature (° C.) | 23 | 23 | 23 | 23 | 23 | 23 | 23 | 30 | 40 | 50 | 50 | 30 |
| | | Treatment time (min) | 15 | 30 | 60 | 180 | 30 | 30 | 30 | 60 | 60 | 60 | 120 | 60 |
| | Washing | Washing solution | acetone | acetone | acetone | acetone | acetone | ethyl acetate | methyl isobutyl ketone | acetone | acetone | acetone | acetone | acetone |
| | | Washing time (sec) | 15 | 15 | 15 | 15 | 15 | 15 | 15 | 15 | 15 | 15 | 15 | 15 |
| | | Temperature (° C.) | 55 | 55 | 55 | 55 | 23 | 55 | 55 | 55 | 55 | 55 | 55 | 55 |
| | Curing | Time (min) | 360 | 360 | 360 | 360 | 0 | 360 | 360 | 120 | 120 | 120 | 120 | 120 |
| Ball performance | Properties | Diameter (mm) | 42.7 | 42.7 | 42.7 | 42.8 | 42.7 | 42.7 | 42.7 | 42.7 | 42.7 | 42.8 | 42.8 | 42.8 |
| | | Weight (g) | 45.4 | 45.5 | 45.5 | 45.6 | 45.4 | 45.5 | 45.4 | 45.5 | 45.5 | 45.6 | 45.7 | 45.5 |
| | | Deflection (mm) | 2.4 | 2.4 | 2.4 | 2.4 | 2.4 | 2.4 | 2.4 | 2.9 | 2.9 | 2.9 | 2.9 | 2.5 |
| | | Initial velocity (m/s) | 77.2 | 77.1 | 77.1 | 77.1 | 77.3 | 77.1 | 77.1 | 77.4 | 77.4 | 77.3 | 77.3 | 77.4 |
| | | Surface hardness (Shore D) | 52 | 52 | 53 | 56 | 52 | 53 | 53 | 62 | 62 | 63 | 64 | 64 |
| | Flight performance (HS = 45 m/s) | Initial velocity (m/s) | 65.5 | 65.5 | 65.6 | 65.4 | 65.7 | 65.5 | 65.6 | 65.2 | 65.2 | 65.2 | 65.1 | 65.7 |
| | | Spin rate (rpm) | 3,584 | 3,413 | 3,403 | 3,280 | 3,470 | 3,452 | 3,475 | 3,072 | 3,071 | 3,059 | 3,084 | 3,077 |
| | | Total distance (m) | 229 | 231 | 231 | 231 | 231 | 230 | 231 | 221 | 223 | 221 | 221 | 220 |
| | Spin performance on approach shots | Spin rate (rpm) | 6,853 | 6,803 | 6,798 | 6,750 | 6,854 | 6,871 | 6,838 | 6,106 | 6,027 | 6,048 | 6,011 | 6,228 |

TABLE 4-continued

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Scuff resistance (at 23° C.), average score | 3.3 | 3.7 | 3.9 | 4.4 | 3 | 3.5 | 3.4 | 4.5 | 4.4 | 4.4 | 4.3 | 4.3 |
| Appearance | good | good | good | good | good | good | good | good | good | good | good | good |
| Productivity | good | good | good | good | good | good | good | good | good | good | good | good |

TABLE 5

|  |  |  | Example | | | | | |
|---|---|---|---|---|---|---|---|---|
|  |  |  | 13 | 14 | 15 | 16 | 17 | 18 |
| Core | Core formulation | | C | C | C | A | A | A |
|  | Core diameter (mm) | | 36.3 | 36.3 | 36.3 | 35.4 | 35.4 | 35.4 |
| Cover | Envelope layer | Material | (1) | (1) | (1) | (3) | (3) | (3) |
|  |  | Thickness (mm) | 1.3 | 1.3 | 1.3 | 1.7 | 1.7 | 1.7 |
|  |  | Shore D hardness (material hardness) | 51 | 51 | 51 | 55 | 55 | 55 |
|  | Intermediate layer | Material | (2) | (2) | (2) | (2) | (2) | (2) |
|  |  | Thickness (mm) | 1.7 | 1.7 | 1.7 | 1.1 | 1.1 | 1.1 |
|  |  | Shore D hardness (material hardness) | 62 | 62 | 62 | 62 | 62 | 62 |
|  | Outermost layer | Material | (6) | (6) | (6) | (4) | (4) | (4) |
|  |  | Thickness (mm) | 0.8 | 0.8 | 0.8 | 0.8 | 0.8 | 0.8 |
|  |  | Shore D hardness (material hardness) | 44 | 44 | 44 | 34 | 34 | 34 |
| Surface treatment | Preliminary warming | Temperature (° C.) | 55 | 55 | 55 | 55 | 55 | 55 |
|  |  | Time (min) | 60 | 60 | 60 | 60 | 60 | 60 |
|  | Dipping treatment | Isocyanate compound | 44V20L | 44V20L | 44V20L | 44V10 | 44V10 | 44V10 |
|  |  | Type of solvent | — | — | — | — | — | — |
|  |  | Concentration (wt %) | 100 | 100 | 100 | 100 | 100 | 100 |
|  |  | Treatment temperature (° C.) | 30 | 30 | 30 | 23 | 23 | 23 |
|  |  | Treatment time (min) | 60 | 60 | 60 | 60 | 60 | 60 |
|  | Washing | Washing solution | acetone | acetone | acetone | acetone | acetone | acetone |
|  |  | Washing time (sec) | 15 | 15 | 15 | 15 | 15 | 15 |
|  | Curing | Temperature (° C.) | 55 | 55 | 55 | 55 | 55 | 55 |
|  |  | Time (min) | 60 | 40 | 20 | 360 | 180 | 60 |
| Ball performance | Properties | Diameter (mm) | 42.7 | 42.8 | 42.8 | 42.7 | 42.7 | 42.7 |
|  |  | Weight (g) | 45.5 | 45.5 | 45.5 | 45.6 | 45.5 | 45.5 |
|  |  | Deflection (mm) | 2.5 | 2.6 | 2.5 | 2.4 | 2.4 | 2.5 |
|  |  | Initial velocity (m/s) | 77.3 | 77.3 | 77.4 | 77.1 | 77.2 | 77.2 |
|  |  | Surface hardness (Shore D) | 64 | 64 | 63 | 53 | 53 | 53 |
|  | Flight performance (HS = 45 m/s) | Initial velocity (m/s) | 65.6 | 65.6 | 65.6 | 66.2 | 66.3 | 66.2 |
|  |  | Spin rate (rpm) | 3,069 | 3,115 | 3,067 | 3,281 | 3,289 | 3,294 |
|  |  | Total distance (m) | 220 | 219 | 224 | 222 | 225 | 222 |
|  | Spin performance on approach shots | Spin rate (rpm) | 6,190 | 6,208 | 6,315 | 6,653 | 6,602 | 6,639 |
|  | Scuff resistance (at 23° C.), average score | | 4.3 | 4.3 | 4.3 | 4.3 | 4.3 | 4.3 |
|  | Appearance | | good | good | good | good | good | good |
|  | Productivity | | good | good | good | good | good | good |

|  |  |  | Example | | | | |
|---|---|---|---|---|---|---|---|
|  |  |  | 19 | 20 | 21 | 22 | 23 |
| Core | Core formulation | | A | A | A | A | A |
|  | Core diameter (mm) | | 35.4 | 35.4 | 35.4 | 35.4 | 35.4 |
| Cover | Envelope layer | Material | (3) | (3) | (3) | (3) | (3) |
|  |  | Thickness (mm) | 1.7 | 1.7 | 1.7 | 1.7 | 1.7 |
|  |  | Shore D hardness (material hardness) | 55 | 55 | 55 | 55 | 55 |
|  | Intermediate layer | Material | (2) | (2) | (2) | (2) | (2) |
|  |  | Thickness (mm) | 1.1 | 1.1 | 1.1 | 1.1 | 1.1 |
|  |  | Shore D hardness (material hardness) | 62 | 62 | 62 | 62 | 62 |
|  | Outermost layer | Material | (4) | (4) | (7) | (4) | (4) |
|  |  | Thickness (mm) | 0.8 | 0.8 | 0.8 | 0.8 | 0.8 |
|  |  | Shore D hardness (material hardness) | 34 | 34 | 53 | 34 | 34 |
| Surface treatment | Preliminary warming | Temperature (° C.) | 55 | 55 | 55 | 55 | 55 |
|  |  | Time (min) | 60 | 60 | 60 | 30 | 30 |
|  | Dipping treatment | Isocyanate compound | J243 | J243 | 44V20L | 44V20L | 44V20L |
|  |  | Type of solvent | — | — | — | — | — |
|  |  | Concentration (wt %) | 100 | 100 | 100 | 100 | 100 |

TABLE 5-continued

|  |  |  |  |  |  |  |  |
|---|---|---|---|---|---|---|---|
|  |  | Treatment temperature (° C.) | 23 | 35 | 23 | 23 | 23 |
|  |  | Treatment time (min) | 15 | 60 | 30 | 1 | 5 |
|  | Washing | Washing solution | acetone | acetone | acetone | acetone | acetone |
|  |  | Washing time (sec) | 15 | 15 | 15 | 15 | 15 |
|  | Curing | Temperature (° C.) | 55 | 55 | 55 | 55 | 55 |
|  |  | Time (min) | 360 | 360 | 360 | 360 | 360 |
| Ball performance | Properties | Diameter (mm) | 42.7 | 42.8 | 42.7 | 42.7 | 42.7 |
|  |  | Weight (g) | 45.5 | 45.7 | 45.6 | 45.4 | 45.4 |
|  |  | Deflection (mm) | 2.4 | 2.4 | 2.4 | 2.4 | 2.4 |
|  |  | Initial velocity (m/s) | 77.1 | 77.1 | 77.1 | 77.2 | 77.2 |
|  |  | Surface hardness (Shore D) | 53 | 53 | 62 | 52 | 52 |
|  | Flight performance (HS = 45 m/s) | Initial velocity (m/s) | 66.1 | 66.1 | 66 | 65.6 | 65.6 |
|  |  | Spin rate (rpm) | 3,243 | 3,196 | 3,001 | 3,572 | 3,568 |
|  |  | Total distance (m) | 224 | 228 | 223 | 228 | 229 |
|  | Spin performance on approach shots | Spin rate (rpm) | 6,648 | 6,453 | 5,987 | 6,785 | 6,808 |
|  |  | Scuff resistance (at 23° C.), average score | 4.3 | 4.1 | 3.4 | 2.6 | 2.8 |
|  |  | Appearance | good | good | good | good | good |
|  |  | Productivity | good | good | good | good | good |

TABLE 6

|  |  |  | Comparative Example |  |  |  |  |  |  |  |
|---|---|---|---|---|---|---|---|---|---|---|
|  |  |  | 1 | 2 | 3 | 4 | 5 | 6 | 7 | 8 |
| Core | Core formulation |  | A | A | B | A | A | A | A | A |
|  | Core diameter (mm) |  | 35.4 | 35.4 | 37.7 | 35.4 | 35.4 | 35.4 | 35.4 | 35.4 |
| Cover | Envelope layer | Material | (3) | (3) | — | (3) | (3) | (3) | (3) | (3) |
|  |  | Thickness (mm) | 1.7 | 1.7 | — | 1.7 | 1.7 | 1.7 | 1.7 | 1.7 |
|  |  | Shore D hardness (material hardness) | 55 | 55 | — | 55 | 55 | 55 | 55 | 55 |
|  | Intermediate layer | Material | (2) | (2) | (2) | (2) | (2) | (2) | (2) | (2) |
|  |  | Thickness (mm) | 1.1 | 1.1 | 1.7 | 1.1 | 1.1 | 1.1 | 1.1 | 1.1 |
|  |  | Shore D hardness (material hardness) | 62 | 62 | 62 | 62 | 62 | 62 | 62 | 62 |
|  | Outermost layer | Material | (4) | (4) | (5) | (7) | (7) | (7) | (4) | (8) |
|  |  | Thickness (mm) | 0.8 | 0.8 | 0.8 | 0.8 | 0.8 | 0.8 | 0.8 | 0.8 |
|  |  | Shore D hardness (material hardness) | 34 | 34 | 40 | 53 | 53 | 53 | 34 | 43 |
| Surface treatment | Preliminary warming | Temperature (° C.) | 55 | 55 | 55 | 55 | 55 | 55 | 55 | — |
|  |  | Time (min) | 30 | 30 | 60 | 60 | 60 | 60 | 60 | — |
|  | Dipping treatment | Isocyanate compound | — | m-MDI | — | — | m-MDI | 44V20L | — | — |
|  |  | Type of solvent | — | acetone | — | — | acetone | acetone | — | — |
|  |  | Concentration (wt %) | — | 25 | — | — | 25 | 25 | — | — |
|  |  | Treatment temperature (° C.) | — | 23 | — | — | 23 | 23 | — | — |
|  |  | Treatment time (min) | — | 30 | — | — | 30 | 30 | — | — |
|  | Washing | Washing solution | — | acetone | — | — | acetone | acetone | — | — |
|  |  | Washing time (sec) | — | 15 | — | — | 15 | 15 | — | — |
|  | Curing | Temperature (° C.) | — | 55 | — | — | 55 | 55 | — | — |
|  |  | Time (min) | — | 360 | — | — | 360 | 360 | — | — |
| Ball performance | Properties | Diameter (mm) | 42.7 | 42.8 | 42.7 | 42.7 | 42.7 | 42.7 | 42.7 | 42.7 |
|  |  | Weight (g) | 45.4 | 45.9 | 45.4 | 45.5 | 45.7 | 45.7 | 45.4 | 45.3 |
|  |  | Deflection (mm) | 2.5 | 2.4 | 3 | 2.4 | 2.4 | 2.4 | 2.5 | 2.4 |
|  |  | Initial velocity (m/s) | 77.3 | 77.1 | 77.4 | 77.2 | 77 | 77 | 77.2 | 77.2 |
|  |  | Surface hardness (Shore D) | 52 | 52 | 61 | 60 | 62 | 62 | 52 | 64 |
|  | Flight performance (HS = 45 m/s) | Initial velocity (m/s) | 65.6 | 65.4 | 65.3 | 66.2 | 66 | 65.8 | 66.4 | 65.7 |
|  |  | Spin rate (rpm) | 3,577 | 3,279V | 3,109 | 2,917 | 2,969 | 2,980 | 3,529 | 3,159 |
|  |  | Total distance (m) | 225 | 223 | 221 | 230 | 218 | 213 | 221 | 235 |

TABLE 6-continued

|  |  | Comparative Example | | | | | | | |
|---|---|---|---|---|---|---|---|---|---|
|  |  | 1 | 2 | 3 | 4 | 5 | 6 | 7 | 8 |
| Spin performance on approach shots | Spin rate (rpm) | 6,728 | 6,682 | 6,171 | 5,909 | 5,942 | 5,977 | 6,718 | 6,539 |
| Scuff resistance (at 23° C.), average score | | 2.3 | 2.8 | 2.1 | 1.6 | 2.3 | 3.6 | 2.4 | 4.6 |
| Appearance | | good | NG | good | good | NG | NG | good | good |
| Productivity | | good | good | good | good | good | good | good | NG |

Based on the results in Tables 4 to 6, the Comparative Examples were inferior to the Working Examples of the invention in the following ways.

Comparative Examples 1, 3, 4 and 7 are examples of cases in which surface treatment was not carried out. In these Comparative Examples, in spite of the efforts made in selecting the golf ball structure and the outermost layer cover material, scuff resistance was a problem in the balls.

Comparative Examples 2, 5 and 6 are examples in which surface treatment was carried out with a 25 wt % acetone solution of m-MDI or 44V20L as the isocyanate compound. From the results, a distinct improvement effect in the scuff resistance could not confirmed in the products treated with an m-MDI/acetone solution, but an improvement effect was confirmed in the products treated with a 44V20L/acetone solution. However, in all of these samples, because surface treatment was carried out using a treatment solution containing an organic solvent, adverse effects on the ball appearance, such as the swelling of support pin marks, were confirmed.

In Comparative Example 8, a composition having resin formulation (8) in Table 2 was selected as the outermost layer material. As a result, although an excellent performance was confirmed in terms of scuff resistance and ball appearance, because the outermost layer cover material contained an isocyanate compound, the percent defectives due to burn contaminants and the like that arose during molding was high.

Japanese Patent Application Nos. 2014-132124 and 2014-132137 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one or more layer encasing the core, wherein the cover has an outermost layer molded of an ether type thermoplastic polyurethane material, and a surface of the cover is treated with a polyisocyanate compound that is free of organic solvent, wherein the rebound resilience of the outermost layer prior to the above surface treatment is at least 35%, and wherein the polyisocyanate compound is a mixture of 4,4'-diphenylmethane diisocyanate (MDI) and polymethylene polyphenyl polyisocyanate containing 41 to 59% by weight of MDI and the viscosity at 25° C. of the polyisocyanate compound is from 25 to 180 mPa·s.

2. The golf ball according to claim 1, wherein the thermoplastic material of which the outermost layer is molded has a resin hardness, expressed in terms of Shore D hardness, of from 30 to 65.

3. The golf ball according to claim 1, wherein the outermost layer has a thickness of from 0.3 to 3.0 mm.

4. The golf ball according to claim 1, wherein the polyurethane or polyurea serving as the thermoplastic material of which the outermost layer material is molded has an isocyanate component which is one or a mixture of two or more selected from the group consisting of
   tolylene-2,6-diisocyanate, tolylene-2,4-diisocyanate,
   4,4'-diphenylmethane diisocyanate,
   polymethylene polyphenyl polyisocyanate,
   1,5-diisocyanatonaphthalene,
   isophorone diisocyanate (including isomer mixtures),
   dicyclohexylmethane-4,4'-diisocyanate,
   hexamethylene-1,6-diisocyanate, m-xylylene diisocyanate,
   hydrogenated xylylene diisocyanate, tolidine diisocyanate,
   norbornene diisocyanate and
   1,4-bis(isocyanatomethyl)cyclohexane.

5. The golf ball according to claim 1 wherein, following treatment of the cover surface, the ball has a surface hardness, expressed in terms of Shore D hardness, of from 30 to 70.

6. The golf ball according to claim 1, wherein the polyisocyanate compound at normal temperature is a dark brown liquid or a blackish brown liquid.

* * * * *